US006655326B2

(12) United States Patent
Purcell et al.

(10) Patent No.: US 6,655,326 B2
(45) Date of Patent: Dec. 2, 2003

(54) ECU TEMPERATURE CONTROL

(75) Inventors: John Jerl Purcell, Billingham (GB); Paul Sowerby, Cleveland (GB); Edward P. Hodzen, Columbus, IN (US); Eric B. Andrews, Bucks (GB)

(73) Assignees: Cummins Engine Company, Ltd., Darlington (GB); Iveco (UK) Ltd., Watford (GB); New Holland UK, Ltd., Basildon (GB)

( * ) Notice: Subject to any disclaimer, the term of this patent is extended or adjusted under 35 U.S.C. 154(b) by 0 days.

(21) Appl. No.: 09/746,175

(22) Filed: Dec. 21, 2000

(65) Prior Publication Data

US 2001/0015181 A1 Aug. 23, 2001

(30) Foreign Application Priority Data

Dec. 21, 1999 (GB) .............................................. 9930114

(51) Int. Cl.$^7$ ................................................. F01P 7/00
(52) U.S. Cl. .................................. 123/41.31; 123/41.1
(58) Field of Search ......................... 123/41.31, 198 E; 165/80.3, 80.2, 80.4, 200, 287, 288, 289

(56) References Cited

U.S. PATENT DOCUMENTS

| | | | | |
|---|---|---|---|---|
| 4,557,225 A | * | 12/1985 | Sagues et al. ........... 123/41.31 |
| 4,893,590 A | * | 1/1990 | Kashimura et al. ...... 123/41.31 |
| 5,042,434 A | * | 8/1991 | Graf et al. ............... 123/41.31 |
| 5,075,822 A | * | 12/1991 | Baumler et al. ......... 123/41.31 |
| 5,207,186 A | * | 5/1993 | Okita ....................... 123/41.31 |
| 5,669,813 A | * | 9/1997 | Jairazbhoy et al. ........... 454/69 |
| 5,671,802 A | * | 9/1997 | Rogers ..................... 123/41.31 |
| 5,924,407 A | * | 7/1999 | Iwaszkiewicz et al. .. 123/41.31 |
| 5,947,189 A | * | 9/1999 | Takeuchi et al. ......... 123/41.31 |
| 6,089,463 A | * | 7/2000 | Hiroi .......................... 165/80.3 |

FOREIGN PATENT DOCUMENTS

| | | |
|---|---|---|
| EP | 0 785 496 | 7/1997 |
| EP | 0785496 A1 * | 7/1997 |
| GB | 2323684 | 3/1997 |

* cited by examiner

*Primary Examiner*—Tony M. Agenbright
*Assistant Examiner*—Jason Benton
(74) *Attorney, Agent, or Firm*—Gary M. Gron

(57) ABSTRACT

An engine having an electronic engine control unit (ECU) is provided with a temperature management system for the ECU to prevent failure of the ECU through overheating. The temperature management system comprising means for monitoring or evaluating the temperature of the ECU to determine when the temperature of the ECU is approaching a predetermined limit and means for limiting further heating of the ECU to prevent the said limit from being exceeded.

10 Claims, 1 Drawing Sheet

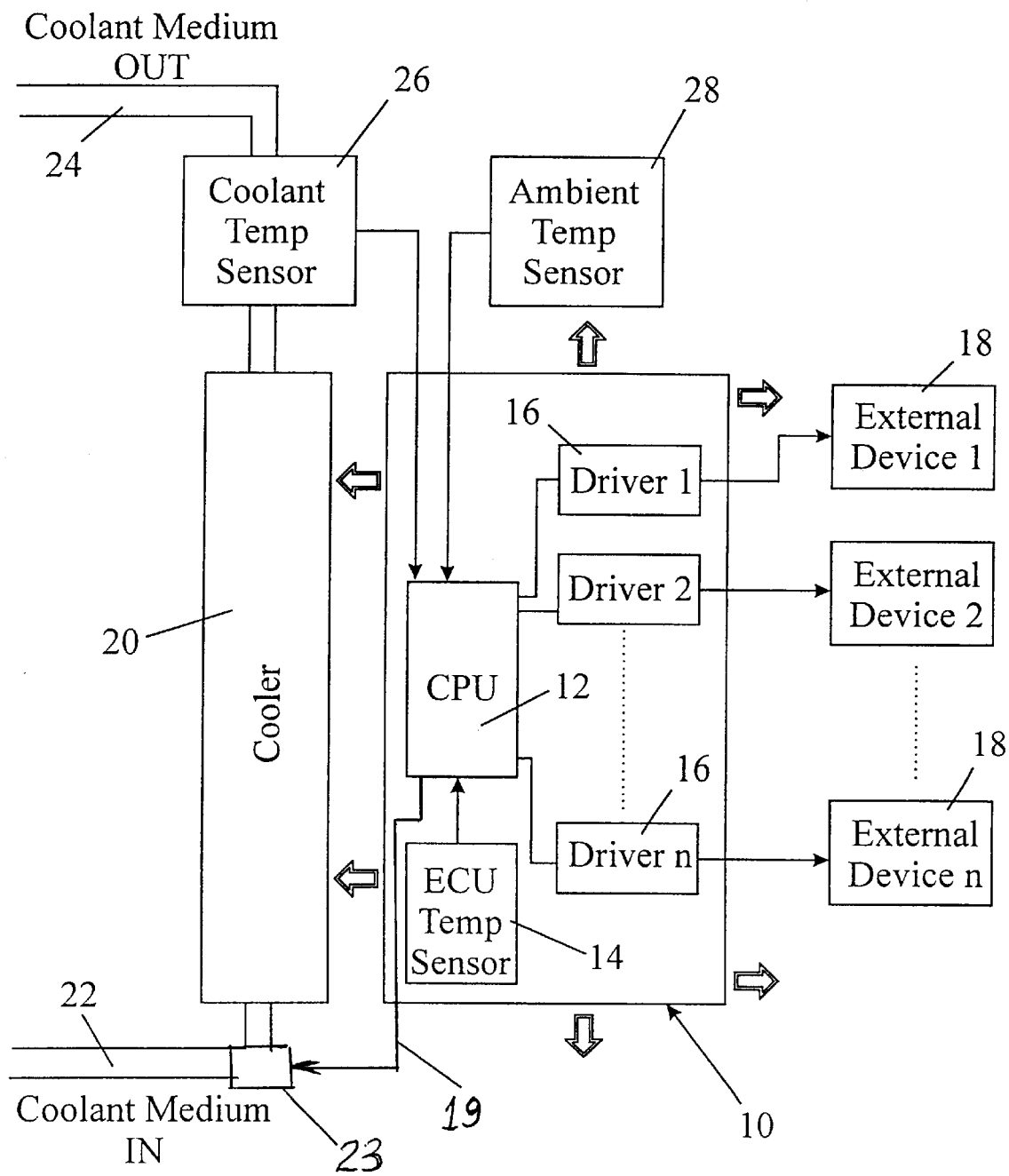

ECU TEMPERATURE CONTROL

FIELD OF THE INVENTION

The present invention relates to controlling the temperature of an electronic engine control unit (ECU).

BACKGROUND OF THE INVENTION

The primary function performed by ECU units in internal combustion engines is to regulate the fuel supply to the engine cylinders but they are sometimes additionally used to perform other function and to control ancillary equipment such as an engine brake, an alternator or an air compressor. Controlling of any components typically results in higher heat dissipation from the ECU.

Overheating is a common cause for the failure of the ECU. This applies particularly to agricultural tractor and heavy duty highway truck engines which are required to operate under widely differing ambient conditions. For this reason, it is known to cool the ECU of such engines by mounting it on a cooler through which flows the fuel being supplied to the engine cylinders.

Hitherto, the ECU cooling system has been designed to cope with certain specified extremes of ambient temperature and engine load but if the engine is operated outside the specified operating range then failure of the ECU could occur. After such a failure, the engine could in some cases operate in a "limp home" mode but it could not be used efficiently.

SUMMARY OF THE INVENTION

With a view to overcoming the foregoing disadvantages, the present invention provides an engine having an electronic engine control unit (ECU) and a temperature management system for the ECU to prevent failure of the ECU through overheating, the temperature management system comprising means for monitoring or evaluating the temperature of the ECU to determine when the temperature of the ECU is approaching a predetermined limit and means for limiting further heating of the ECU to prevent the said limit from being exceeded.

The invention is based on predicting danger of failure of the ECU as a result of overheating and taking action to prevent such failure before an excessive temperature is reached.

The prevailing temperature of the ECU can be measured directly, for example by a temperature sensor in contact with the ECU, or indirectly, for example by measuring the temperature of the coolant flowing through a cooler in contact with the ECU. Alternatively, means may be provided for measuring the temperature of ambient air and of any cooling medium serving to cool the ECU and evaluating from the measured temperatures the maximum rate of power dissipation in the ECU. Once it has been ascertained by measurement or evaluation that the temperature of the ECU is approaching (but has not yet reached) the point where there is a risk of failure through overheating, steps are taken to limit any further temperature rise.

The temperature rise of the ECU is determined by two factors, namely the amount of heat generated by the ECU and the amount of heat removed from the ECU. Either or both of these factors can be modified when it has been determined that a risk of overheating is imminent.

To improve the cooling of the ECU, it is possible to switch on a fan, increase the rate of coolant flow, or alter the temperature of the thermostat in the engine cooling system. To reduce the rate of heat generation within the ECU, it is possible to reduce the maximum engine load, or switch off ancillary equipment.

BRIEF DESCRIPTION OF THE DRAWINGS

The invention will now be described further, by way of example, with reference to the accompanying drawing which is a block schematic diagram of an ECU temperature management system of the invention.

DETAILED DESCRIPTION OF THE PREFERRED EMBODIMENTS

The drawing shows an engine control unit (ECU), generally designated 10, that comprises a central processing unit (CPU) 12 and various drivers 16. It is generally the drivers 16 that generate heat as they form part of power circuits and, in general, the more drivers 16 are in use, and the greater the load current controlled by these drivers, the more heat is generated in the ECU. The illustrated ECU is shown as incorporating an internal temperature sensor which, though preferred, is optional.

The drawing shows external devices 18 controlled by the drivers 18. These necessarily include the engine fuel injectors but may include other ancillary equipment such as an engine brake, an engine driven alternator or air compressor. Each such device, depending upon the current that it draws from its driver 16, will contribute to the power dissipation in the ECU. Thus, for example, when the engine is operated under high load with the injectors open for long periods of time, more heat is dissipated in the corresponding drivers 16 than when the engine is operated at lower load with the injectors open for shorter periods.

The ECU is cooled by a cooler 20 which is effectively a heat exchanger in thermal contact with the ECU through which flows a coolant medium, commonly the fuel supply to the engine. The coolant enters the cooler 20 through a supply line 22 and leaves it through a discharge line 24. A coolant temperature sensor 26 is provided in the discharge line 26 and additionally an ambient temperature sensor 28 is used to measure the air temperature in the vicinity of the ECU. The output signals of all three temperature sensors 14, 26 and 28 are supplied to the CPU 12.

During operation of the ECU 10, heat is generated and is lost, as represented by arrows in the drawing, to the cooler 20 and to the ambient air. The CPU 10 of the ECU 12 in addition to performing its normal function of controlling the drivers 16 of the various external devices 18 constantly performs temperature calculations to determine the risk of overheating of the ECU. In this respect, the CPU may use an algorithm that has as its input variables the temperatures of the coolant (sensor 26) and the ambient air (sensor 28), and, if available, the temperature of the ECU 10 itself (sensor 14) to determine the maximum rate at which heat can be generated by the ECU without exceeding the prevailing cooling capacity.

The CPU may also evaluate from the signals that it generates to control the drivers 16, the rate at which heat is generated by the ECU. If the heat output of the ECU 10 exceeds the evaluated maximum cooling rate then the CPU takes action to prevent the ECU from overheating.

The action may take one of two forms. The first is to increase the maximum power dissipation and the second is to limit internal heat generation.

It is possible to variably control the cooling rate as schematically illustrated by box 23 which is controlled by the CPU 12 through link 25. One example of control is to increase air flow for example by switching on a fan or increasing the speed of a variable speed fan if the engine is so equipped.

Further possibilities are to increase the flow rate of the coolant heat transfer medium flow rate, for example by controlling the fuel pump, and lowering the engine operating temperature by means of an electronic thermostat which should decrease the peak ambient air temperature.

The internal power dissipation can be reduced by turning off non-essential drivers that dissipate heat when they are energised. The drivers may control systems that are not essential for safe vehicle/system operation. The number of drivers to be turned off will depend on the measured internal temperature, if known, or the evaluated maximum cooling capacity available.

The drivers controlling the fuel supply to the engine cylinders may themselves be used to reduce heat generation. Thus the fuel supply to selected cylinders may be shut off or the engine operated at part load with a reduced fuel supply to all of the cylinders.

Alternatively, the drivers associated with ancillary equipment such as an engine brake, an alternator or air compressor may be switched off or operated with reduced power dissipation in the drivers until the ECU no longer risks being overheated.

Having thus described the invention, what is claimed as novel and desired to be secured by Letters Patent of the United States is:

1. A control system for an engine, said control system comprising an electronic engine control unit (ECU), at least one driver circuit in said ECU for controlling an external device, an external device controlled by said driver circuit, and a temperature management system for the ECU to prevent failure of the ECU through overheating, said temperature management system comprising:
   means for sensing a temperature indicative of the temperature of the ECU,
   means for setting a predetermined maximum temperature of said ECU,
   means integrated into and a primary component of the engine operating system and controlled by said ECU for variably cooling said ECU, and
   means for comparing the sensed temperature to said predetermined maximum, said comparing means commanding said variable cooling means to increase cooling of said ECU when the sensed temperature approaches said predetermined maximum.

2. An engine as claimed in claim 1, wherein said temperature sensing means comprises a temperature sensor in contact with the ECU for measuring the temperature of the ECU.

3. An engine as claimed in claim 1, wherein said temperature sensing means comprises a temperature sensor incorporated into the ECU for measuring the temperature of the ECU.

4. An engine as claimed in claim 1, wherein the means for variably cooling the ECU comprises a fan moving fluid in ultimate heat transfer relation to said ECU and means for switching on said fan of a variable speed fan for increasing cooling of said ECU.

5. A control system for an engine, said control system comprising an electronic engine control unit (ECU), at least one driver circuit in said ECU for controlling an external device, an external device controlled by said driver circuit, and a temperature management system for the ECU to prevent failure of the ECU through overheating, said temperature management system comprising:
   means for sensing a temperature indicative of the temperature of the ECU,
   means for setting a predetermined maximum temperature of said ECU,
   means connected to the engine operating system and controlled by said ECU for variably cooling said ECU, and
   means for comparing the sensed temperature to said predetermined maximum, said comparing means commanding said variable cooling means to increase cooling of said ECU when the sensed temperature approaches said predetermined maximum, wherein said variable cooling means comprises an engine cooling system with a heat transfer fluid flowing in heat transfer relation to said ECU and wherein the means for variably cooling the ECU comprises means for increasing the rate of coolant flow.

6. An engine as claimed in claim 4 further comprising a thermostat for controlling flow of said heat transfer fluid and wherein the means for variably cooling the ECU comprise means for reducing the temperature of said thermostat.

7. An engine as claimed in claim 1 further comprising means for responsive to said comparing means for limiting the heat generation of said ECU to further prevent said ECU from reaching said predetermined maximum temperature.

8. An engine as claimed in claim 7, wherein the means for limiting further heating of the ECU comprises means for reducing the fuel supply to said engine.

9. An engine as claimed in claim 7, wherein the means for limiting further heating of the ECU comprises means for disabling drivers in the ECU serving to control ancillary equipment.

10. In an engine having an electronic engine control unit (ECU), a temperature management system for the ECU to prevent failure of the ECU through overheating, said temperature management system comprising:
   means for sensing a temperature indicative of the temperature of the ECU,
   means for setting a predetermined maximum temperature of said ECU,
   means controlled by said ECU for variably cooling said ECU,
   means for comparing the sensed temperature to said predetermined maximum, said comparing means commanding said variable cooling means to increase cooling of said ECU when the sensed temperature approaches said predetermined maximum, and
   wherein said temperature sensing means comprises means for measuring the temperature of ambient air and of the medium in said variable cooling means serving to cool the ECU and for evaluating from the measured temperatures the maximum rate of power dissipation in the ECU and controlling at least one of increasing cooling to said ECU and decreasing heat generation of said ECU.

* * * * *